(12) United States Patent
Hu et al.

(10) Patent No.: US 10,686,993 B2
(45) Date of Patent: Jun. 16, 2020

(54) CORRECTING METHOD FOR OPTICAL MECHANISM

(71) Applicant: TDK TAIWAN CORP., Taoyuan (TW)

(72) Inventors: Chao-Chang Hu, Taoyuan (TW); Shun-Chieh Tang, Taoyuan (TW); Shu-Shan Chen, Taoyuan (TW); Chih-Wei Weng, Taoyuan (TW); Shao-Kuang Huang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 71 days.

(21) Appl. No.: 16/158,763

(22) Filed: Oct. 12, 2018

(65) Prior Publication Data
US 2019/0116317 A1    Apr. 18, 2019

Related U.S. Application Data

(60) Provisional application No. 62/571,435, filed on Oct. 12, 2017.

(30) Foreign Application Priority Data

Sep. 13, 2018   (CN) .......................... 2018 1 1067602

(51) Int. Cl.
*H04N 5/232* (2006.01)
*G03B 5/00* (2006.01)
(Continued)

(52) U.S. Cl.
CPC ......... *H04N 5/23296* (2013.01); *G02B 7/023* (2013.01); *G02B 7/08* (2013.01);
(Continued)

(58) Field of Classification Search
CPC .......... G02B 7/08; G02B 7/023; G02B 7/005; G02B 7/102; G03B 5/06;
(Continued)

(56) References Cited

U.S. PATENT DOCUMENTS

2006/0092285 A1* 5/2006 Shin ..................... H04N 5/2253
                                                            348/208.7
2007/0077049 A1* 4/2007 Tsai ..................... H04N 5/2257
                                                                396/91

(Continued)

*Primary Examiner* — Lin Ye
*Assistant Examiner* — Tuan H Le
(74) *Attorney, Agent, or Firm* — Muncy, Geissler, Olds & Lowe, P.C.

(57) ABSTRACT

A correction method for an optical mechanism having an optical member and a fixed portion is provided, including: an external apparatus measures the angle between the optical axis of the optical member and a reference surface of the fixed portion; the result of measuring the angle between the optical axis and the reference surface is compiled into data; the data is input into a control module; the control module transmits a signal to a driving module according to the data; and the driving module drives the optical member to rotate or move relative to the fixed portion upon receiving the signal. The optical mechanism does not include a sensor to detect the angle between the optical axis and the reference surface.

12 Claims, 9 Drawing Sheets

(51) Int. Cl.
*G02B 7/02* (2006.01)
*G02B 7/08* (2006.01)

(52) U.S. Cl.
CPC ........... *G03B 5/00* (2013.01); *H04N 5/23287* (2013.01); *G03B 2205/0053* (2013.01)

(58) Field of Classification Search
CPC .... G03B 2205/0069; G03B 2205/0023; H04N 5/232; H04N 5/2254; H01L 27/14618; H01L 2924/0002
See application file for complete search history.

(56) References Cited

U.S. PATENT DOCUMENTS

| | | | | |
|---|---|---|---|---|
| 2009/0027785 A1* | 1/2009 | Tanaka | ............... | G01D 5/34715 359/824 |
| 2010/0265387 A1* | 10/2010 | Yen | ........................ | G02B 7/005 348/345 |
| 2014/0333829 A1* | 11/2014 | Lee | ...................... | H04N 5/2251 348/373 |
| 2015/0229842 A1* | 8/2015 | Kasamatsu | .......... | H04N 5/2254 348/208.11 |

\* cited by examiner

CORRECTING METHOD FOR OPTICAL MECHANISM

CROSS REFERENCE TO RELATED APPLICATIONS

This application claims the benefit of U.S. Provisional Application No. 62/571,435, filed on Oct. 12, 2017, and China Patent Application No. 201811067602.3, filed on Sep. 13, 2018, the entirety of which are incorporated by reference herein.

BACKGROUND OF THE INVENTION

Field of the Invention

The application relates in general to a correction method for an optical mechanism, and in particular, to a correction method for an optical mechanism having an optical member.

Description of the Related Art

As technology has advanced, recent electronic devices (such as tablet computers and smartphones) usually include a lens module capable of aiding in photography or recording video. These electronic devices have become more commonplace, and have been developed to be more convenient and thin. More and more choices are available for users to choose from.

When using an electronic device having a lens module, the lens module can be driven to move relative to an image sensor inside the electronic device, thereby focusing the lens. However, when the lens module moves, it might tilt relative to the image sensor due to non-uniform driving forces acting upon it. Therefore, how to address the aforementioned problem has become an important issue.

BRIEF SUMMARY OF INVENTION

To address the deficiencies of conventional products, an embodiment of the invention provides a correction method for an optical mechanism having an optical member and a fixed portion. The method includes: the angle between the optical axis of the optical member and a reference surface of the fixed portion is measured using an external apparatus; the result of measuring the angle between the optical axis and the reference surface is compiled into data; the data is input into a control module; a signal is transmitted to a driving module by the control module according to the data; and the optical member is driven to rotate or move relative to the fixed portion by the driving module upon receiving the signal. The optical mechanism does not include a sensor to detect the angle between the optical axis and the reference surface.

In some embodiments, the step of measuring the angle between the optical axis and the reference surface by the external apparatus further comprises measuring the angle between the optical axis and the reference surface with different distances or angles between the optical member and the fixed portion.

In some embodiments, the step of compiling the result of measuring the angle between the optical axis and the reference surface into data further comprises converting the result of measuring the angle between the optical axis and the reference surface into a trend line. The step of conversion can be performed by an external computer. The step of compiling the result of measuring the angle between the optical axis and the reference surface into data further comprises calculating the difference between the tread line and the angle between the optical axis and the fixed portion. In some embodiments, the step of conversion can be performed by a central processing unit in the control module (the control module can comprise the central processing unit and a driver integrated circuit) after the data is input into the control module.

In some embodiments, the correction method further comprises detecting the distance or the angle between the optical member and the fixed portion with a position sensor; and making sure that the distance or the angle between the optical member and the fixed portion corresponds to the angle between the optical axis and the reference surface, and compiling the same into data.

In some embodiments, the correction method further comprises recording the relationship between the distance or the angle between the optical member and the fixed portion and the current flowing through the driving module; and ensuring that the current flowing through the driving module corresponds to the angle between the optical axis and the reference surface, and compiling the same into data. In some embodiments, the correction method further comprises recording the relationship between the distance or the angle between the optical member and the fixed portion and the current flowing through the driving module with various angles between the optical axis and the gravity direction; employing a posture detection unit to detect the relationship between the optical axis and the gravity direction; and using the control module to make corrections according to the relationship between the optical axis and the gravity direction.

In some embodiments, the optical mechanism, the control module, and the posture detection unit are disposed in a portable device.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the correction method for the optical mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
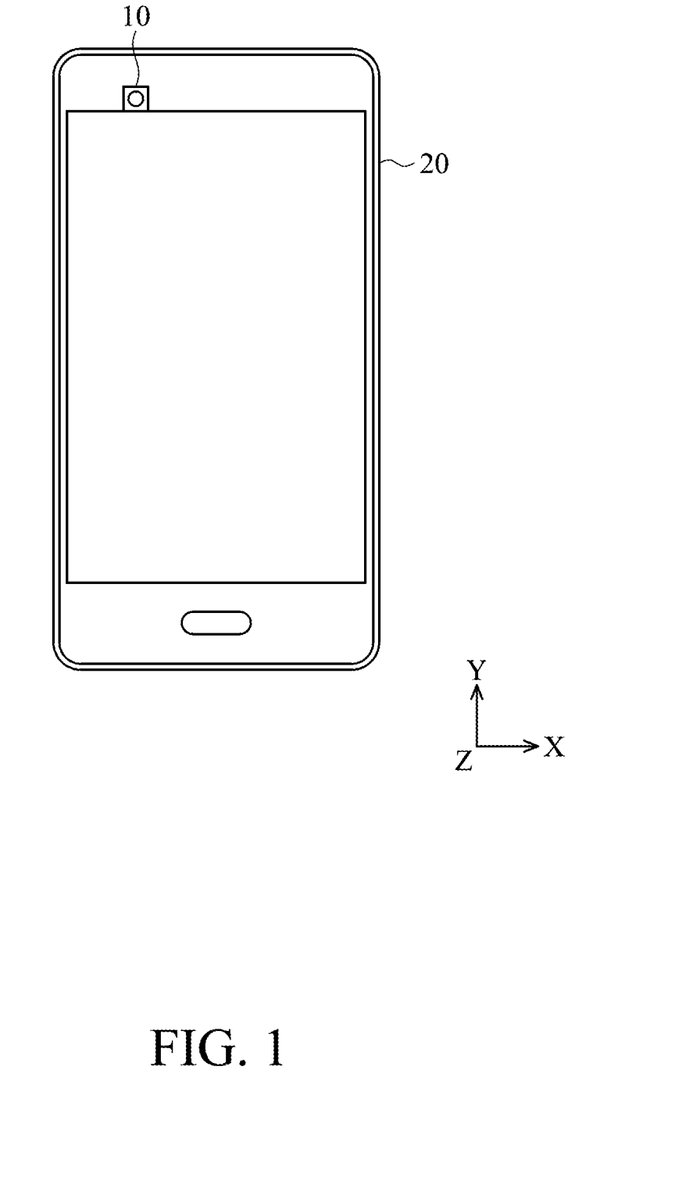
FIG. 1 is a schematic diagram of an electronic device according to an embodiment of the invention.

Referring to FIG. 1, in an embodiment of the invention, an optical mechanism 10 can be disposed in an electronic device 20 and used to take photographs or record video. The electronic device 20 can be a portable device (such as a smartphone or a digital camera). When taking photographs or recording video, an external light can pass through the optical mechanism 10 and form an image on an image sensor (not shown) in the electronic device 20.

Figure 2:
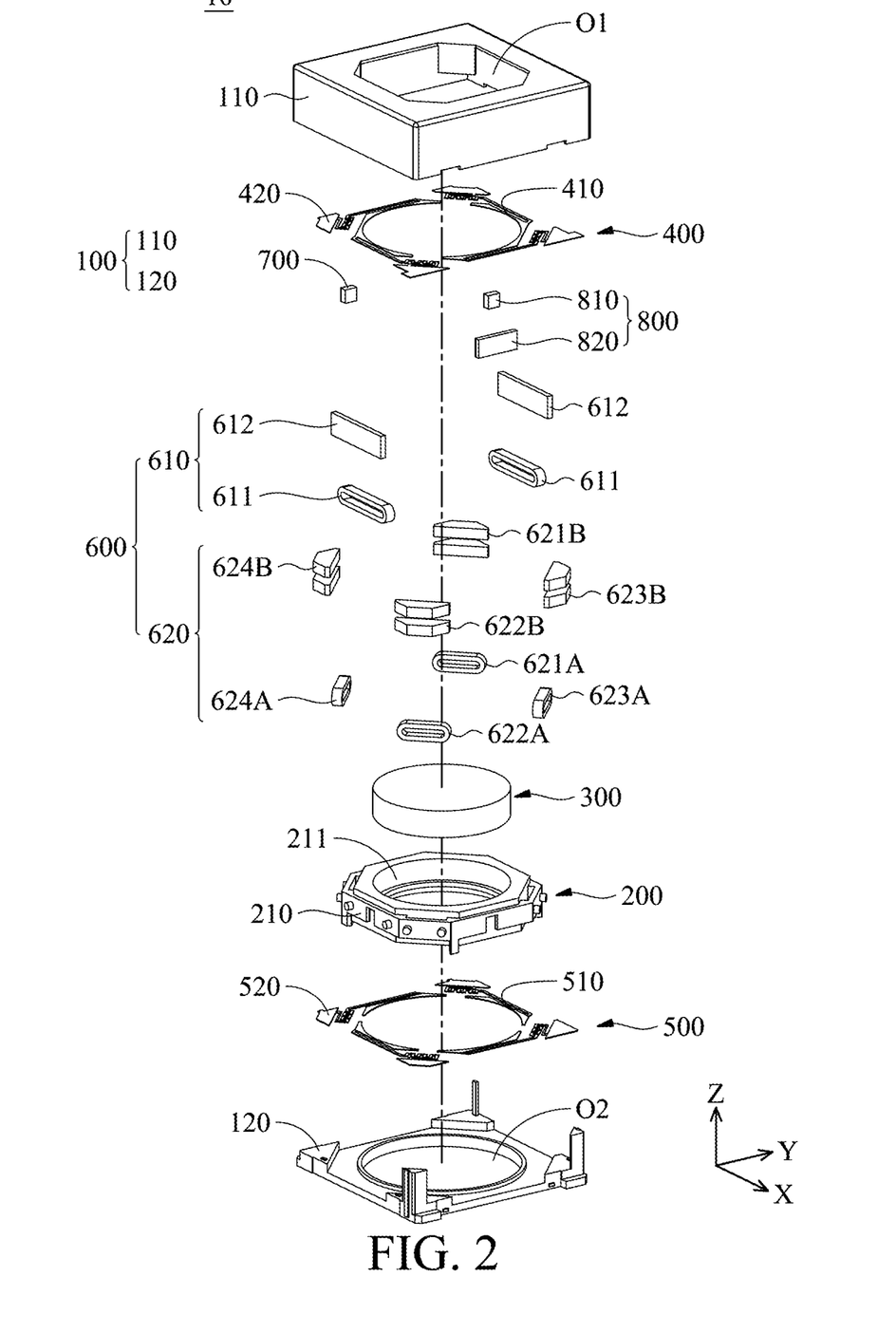
FIG. 2 is an exploded-view diagram of an optical mechanism according to an embodiment of the invention.

FIG. 2 is an exploded-view diagram of the optical mechanism 10. As shown in FIG. 2, the optical mechanism 10 primarily comprises a fixed portion 100, a movable portion 200, an optical member 300, a first elastic member 400, a second elastic member 500, a driving module 600, a control module 700, and a position detecting module 800.

The fixed portion 100 comprises a frame 110 and a bottom 120. The frame 110 and the bottom 120 can be assembled to form a rectangular hollow box, and the optical member 300, the first elastic member 400, the second elastic member 500, the driving module 600, the control module 700, and the position detecting module 800 are surrounded by the frame 110 and accommodated in the hollow box.

For example, the movable portion 200 can be an optical member holder 210. The first elastic member 400 and the second elastic member 500 are respectively disposed on the opposite sides of the optical member holder 210, therefore, the optical member holder 210 can be disposed between the first elastic member 400 and the second elastic member 500. An inner section 410 and an outer section 420 of the first elastic member 400 are respectively connected to the optical member holder 210 and the frame 110, and an inner section 510 and an outer section 520 of the second elastic member 500 are respectively connected to the optical member holder 210 and the bottom 120. Thus, the optical member holder 210 can be hung in the hollow box by the first elastic member 400 and the second elastic member 500.

Furthermore, a through hole 211 is formed at the center of the optical member holder 210, and the optical member 300 can be disposed in the through hole 211. The frame 110 has an optical hole O1 and the bottom 120 has an optical hole O2 corresponding to the optical hole O1. When the optical member holder 210 is hung in the box by the first elastic member 400 and the second elastic member 500, the through hole 211 on the optical member holder 210 corresponds to the optical hole O1 of the frame 110 and the optical hole O2 of the bottom 120. Thus, an external light can pass through the optical hole O1, optical member 300, and the optical hole O2 in sequence and reach the image sensor in the electronic device 20.

Referring to FIG. 2, in this embodiment, the driving module 600 comprises a pair of focusing driving assemblies 610, which comprising at least one electromagnetic driving member 611 and at least one electromagnetic driving member 612 corresponding to each other. The electromagnetic driving member 611 is disposed on the optical member holder 210, and the electromagnetic driving member 612 is disposed on the fixed portion 100 (the frame 110 or the bottom 120). The electromagnetic effect between the electromagnetic driving member 611 and the electromagnetic driving member 612 can drive the optical member holder 210 and the optical member 300 disposed thereon to move along the Z-axis relative to the fixed portion 100.

For example, the first electromagnetic driving member 611 can be a driving coil, and the second electromagnetic driving member 612 can be a magnetic member (such as a magnet). When a current flows through the driving coil (the first electromagnetic driving member 611), an electromagnetic effect is generated between the driving coil and the magnet, and provides an electromagnetic force along the Z-axis on the optical member holder 210. Therefore, the optical member holder 210 and the optical member 300 disposed thereon can move along the Z-axis relative to the fixed portion 100, and further move along the Z-axis relative to the image sensor in the electronic device 20. The purpose of focus adjustment can be achieved.

In some embodiments, the electromagnetic driving member 611 can be a magnetic member, and the electromagnetic member 612 can be a driving coil.

As shown in FIG. 2, in this embodiment, the driving module 600 further comprises a correcting driving assembly 620, which comprising electromagnetic driving members 621A, 621B, 622A, 622B, 623A, 623B, 624A, and 624B. The electromagnetic driving members 621A, 622A, 623A, and 624A are disposed on the optical member holder 210, and the electromagnetic driving members 621B, 622B, 623B, and 624B are disposed on the fixed portion 100. The electromagnetic driving members 621A and 621B and the electromagnetic driving members 622A and 622B are disposed on the opposite corners of the hollow box, and the electromagnetic driving members 623A and 623B and the electromagnetic driving members 624A and 624B are disposed on the different opposite corners of the hollow box.

Figure 3:
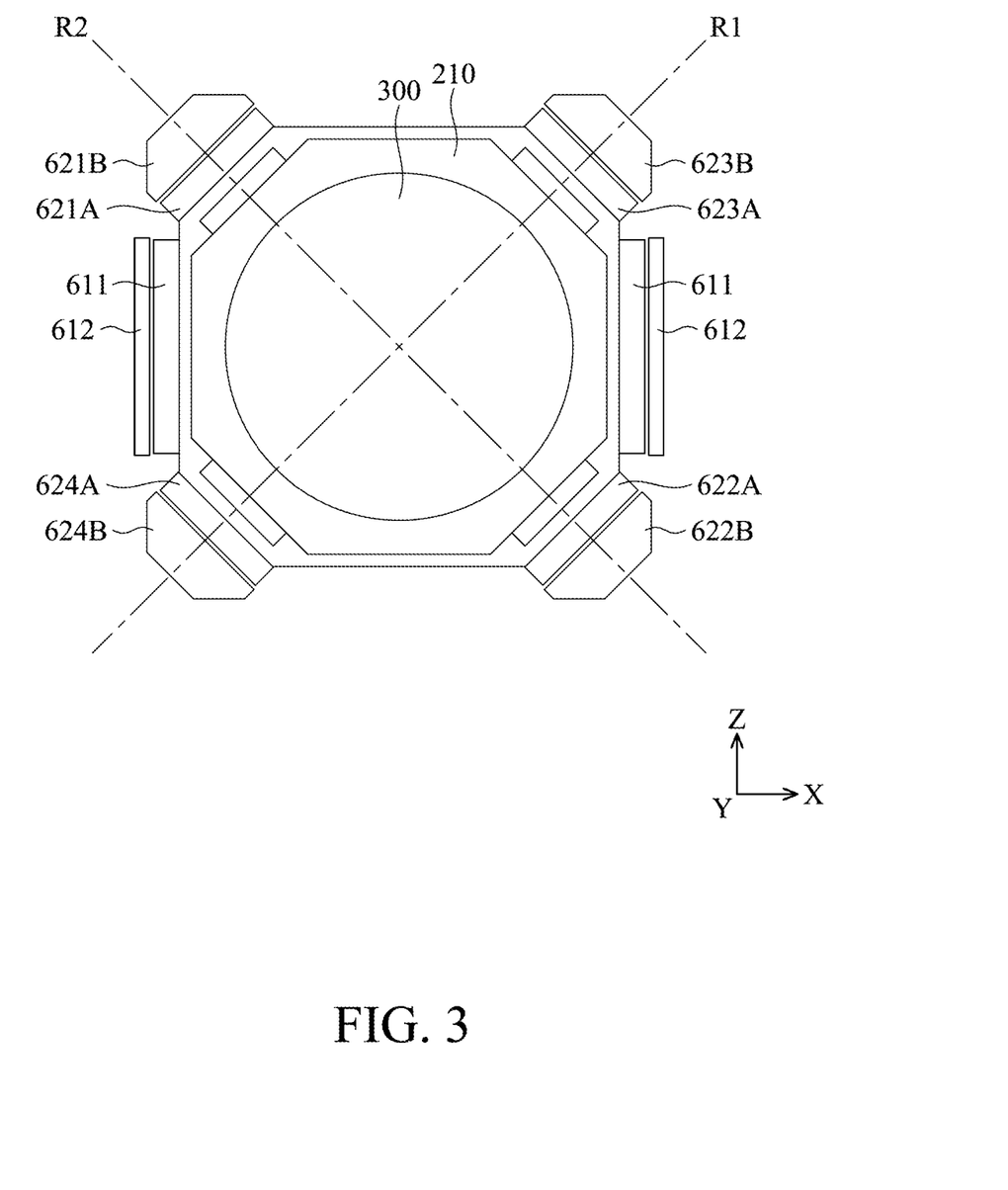
FIG. 3 is a schematic diagram of a movable portion, an optical member, and a driving module according to an embodiment of the invention.

For example, the electromagnetic driving members 621A, 622A, 623A, and 624A can be driving coils, and the electromagnetic driving members 621B, 622B, 623B, and 624B can be magnetic members (such as magnets). As shown in FIG. 3, when currents with different energies or different directions flow through the electromagnetic driving members 621A and 622A, the driving force provided by the electromagnetic driving members 621A and 621B is different from the driving force provided by the electromagnetic driving members 622A and 622B. Consequently, the optical member holder 210 and the optical member 300 disposed thereon can be driven to rotate around a rotation axis R1. Similarly, when currents with different energies or different directions flow through the electromagnetic driving members 623A and 624A, the driving force provided by the electromagnetic driving members 623A and 623B is different from the driving force provided by the electromagnetic driving members 624A and 624B. Consequently, the optical member holder 210 and the optical member 300 disposed thereon can be driven to rotate around a rotation axis R2.

Since the electromagnetic driving members 621A, 621B, 622A, 622B, 623A, 623B, 624A, and 624B are disposed on the four corners of the hollow box, the rotation axis R1 is perpendicular to the rotation axis R2 in this embodiment.

In some embodiments, the electromagnetic driving members 621A, 622A, 623A, and 624A can be magnetic members, and the electromagnetic driving members 621B, 622B, 623B, and 624B can be driving coils. In some embodiments, the driving module 600 can drive the optical member holder 210 to move horizontally along the Z-axis by providing the same currents to the electromagnetic driving members 621A and 622A and/or the electromagnetic driving members 623A and 624A. Thus, the focusing driving assembly 610 can be omitted, and the dimensions of the optical mechanism 10 can be reduced.

Referring to FIG. 2, the control module 700 in the optical mechanism 10 can be disposed on the optical member holder 210 and electrically connected to the driving coils of the driving module 600, so as to control the currents supplying to the driving coils. In this embodiment, the control module 700 comprises a central processing unit (CPU), a driver integrated circuit (driver IC), and/or a memory (such as an electrically-erasable programmable read-only memory (EE-PROM)). In some embodiments, the control module 700 can be disposed on the fixed portion 100 of the optical mechanism 10.

The position detecting module 800 comprises a position sensor 810 and a sensing object 820. The position sensor 810 is disposed on the optical member holder 210, and the sensing object 820 is disposed on the fixed portion 100. The position sensor 810 can determine the distance between the optical member 300 and the bottom 120 in the Z-axis by detecting the relative movement of the position sensor 810 and the sensing object 820. For example, the position sensor 810 can be a Hall effect sensor, a magnetoresistance effect sensor (MR sensor), a giant magnetoresistance effect sensor (GMR sensor), a tunneling magnetoresistance effect sensor (TMR sensor), or a fluxgate sensor, and the sensing object 620 can be a magnet.

Figure 4A:
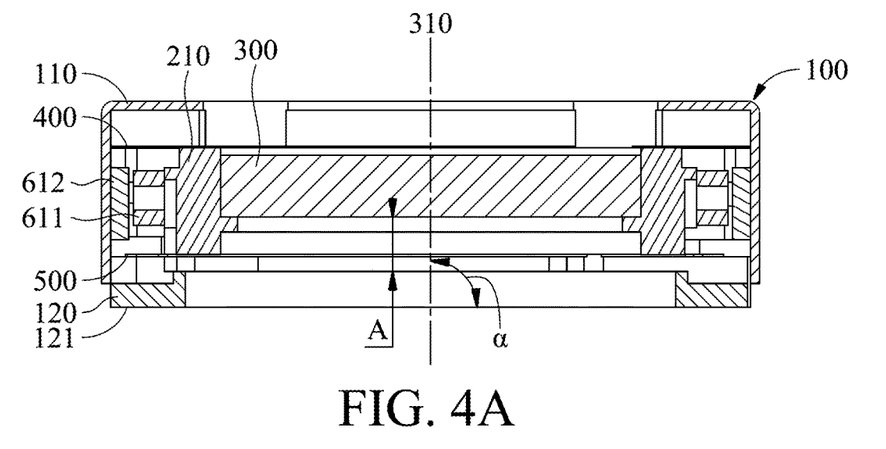
FIG. 4A is a schematic diagram of the optical mechanism, wherein a distance A is formed between the optical member and the bottom.
Figure 4B:
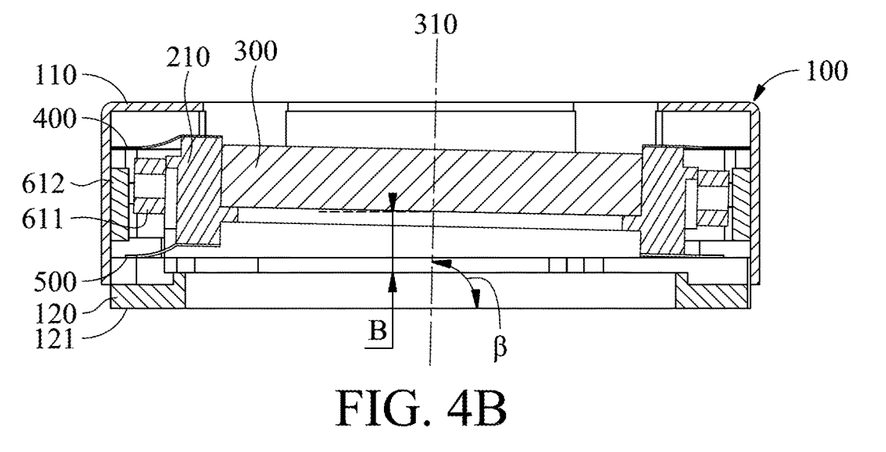
FIG. 4B is a schematic diagram of the optical mechanism, wherein a distance B is formed between the optical member and the bottom.
Figure 4C:
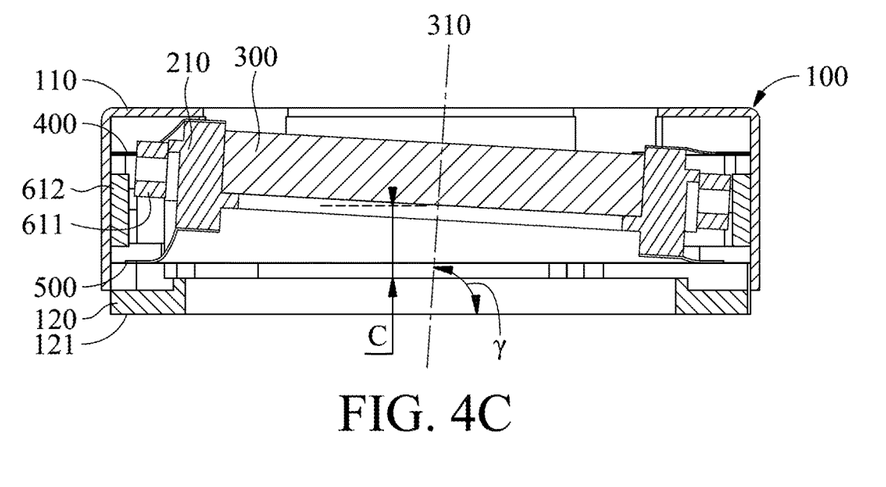
FIG. 4C is a schematic diagram of the optical mechanism, wherein a distance C is formed between the optical member and the bottom.
Figure 5:
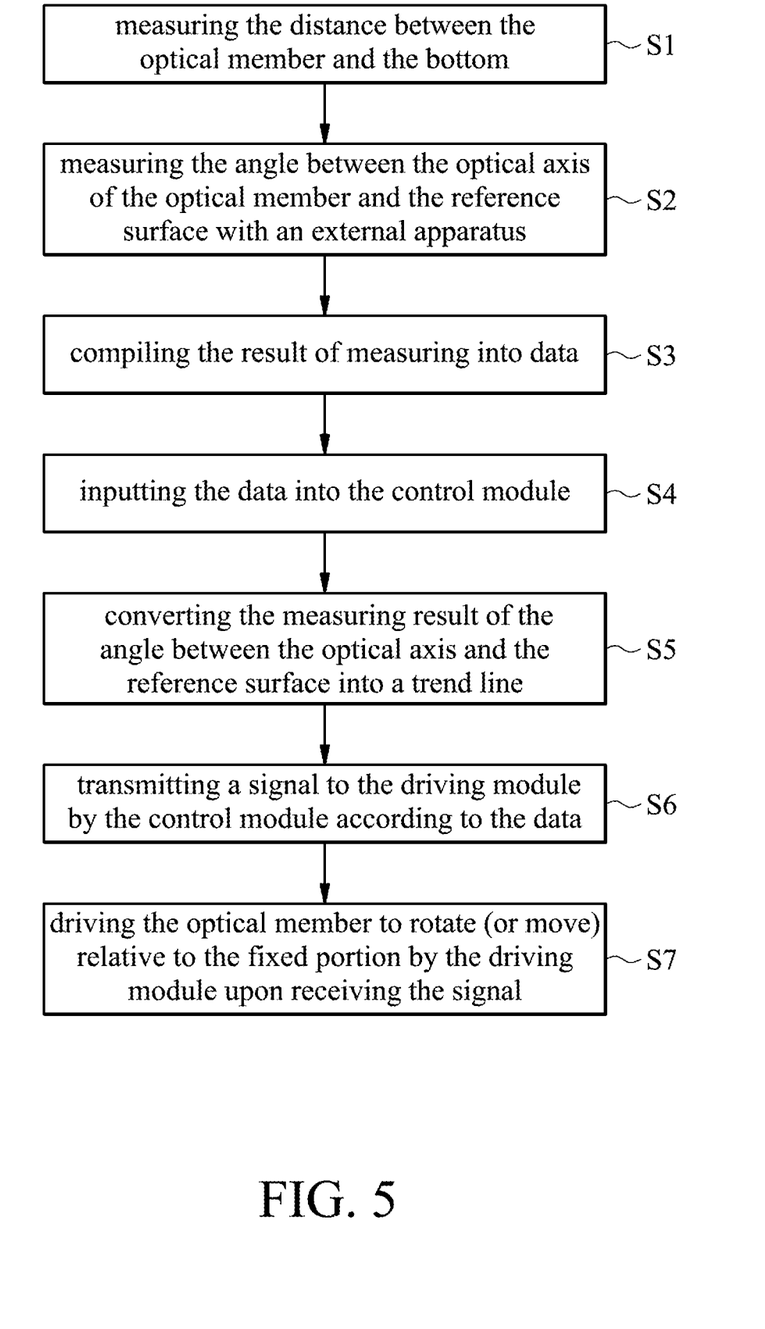
FIG. 5 is a flow chart of the correction method for the optical mechanism according to an embodiment of the invention.

Referring to FIGS. 4A-5, the correction method for the optical mechanism 10 is discussed below. As shown in FIGS. 4A-4C, when the focusing driving assembly 610 of the driving module 600 drives the optical member holder 210 and the optical member 300 to move relative to the fixed portion 100, the optical member holder 210 may slightly tilt. Accordingly, the optical axis 310 of the optical member 300 is inclined relative to the reference surface 121 of the bottom 120 and not perpendicular to the reference surface 121. Therefore, the user can use the position detecting module 800 to measure the distance between the optical member 300 and the bottom 120 (step S1), and use an external apparatus to measure the angle between the optical axis 310 of the optical member 300 and the reference surface 121 (step S2). The measurement result can be compiled into data (step S3), and the data can be input into the control module 700 (step S4). The external apparatus can be a posture detection device of a voice coil motor.

For example, as shown in FIGS. 4A-4C, the user can use the position detecting module 800 and the external apparatus to determine, via a measurement, that when the distance between the optical member 300 and the bottom 120 is A, B, or C, the angle between the optical axis 310 and the reference surface 121 is relatively $\alpha$, $\beta$, or $\gamma$. The aforementioned measurement result can be compiled into data that can be input into the control module 700.

When the control module 700 receives the data, the central processing unit can convert the result of measuring the angle between the optical axis 310 and the reference surface 121 into a trend line, and the equation of the trend line (such as a polynomial equation) can be stored in the driver integrated circuit or the memory (step S5).

When the focusing driving assembly 610 of the driving module 600 drives the optical member holder 210 and the optical member 300 to move along the Z-axis relative to the fixed portion 100, the control module 700 can transmit a signal to the driving module 600 according to the data of the trend line (step S6). When the driving module 600 receives the signal, the correcting driving assembly 620 can drive the optical member 300 to rotate (or move) relative to the fixed portion 100, so as to make the optical axis 310 perpendicular to the reference surface 121 (step S7).

In some embodiments, the step of converting the result of measuring the angle between the optical axis 310 and the reference surface 121 to the trend line can be performed before the step of inputting the data into the control module 700. In other words, the step of conversion into the trend line can be performed by an external computing unit (such as a computer), and the equation of the trend line can be treated as data and input into the control module 700. Therefore, the central processing unit can be omitted from the control module 700. The control module 700 can merely comprise the driver integrated circuit or the memory.

In some embodiments, the step of compiling the result of measuring the angle between the optical axis 310 and the reference surface 121 to form the data can further comprise calculating the difference between the trend line and the actual measure angle. The value of the difference can be treated as part of the data and be input into the driver integrated circuit or the memory of the control module 700, so as to make the correction more accurate. In some embodiments, the step of converting the result of measuring the angle between the optical axis 310 and the reference surface 121 to the trend line can be omitted, and the data of the measurement result can be directly stored in the driver integrated circuit or the memory of the control module 700.

In some embodiments, the correction method for the optical mechanism 10 can further comprise recording the relationship between the distance between the optical member 300 and the bottom 120 and the current flowing through the driving coil of the focusing driving assembly 610, making sure that the current corresponds to the angle between the optical axis 310 and the reference surface 121, and compiling the same into data. Therefore, the position detecting module 800 can be omitted from the optical mechanism 10, and the optical mechanism 10 can be miniaturized. In these embodiments, the step of measuring the distance between the optical member 300 and the bottom 120 (step S1) can be performed by an external position sensor.

In some embodiments, the correction method for the optical mechanism 10 can further comprise recording the relationship between the distance between the optical member 300 and the bottom 120 and the current flowing through the driving module 600 with various angles between the optical axis 310 and the gravity direction. In these embodiments, the optical mechanism 10 includes a posture detection unit. The correction method for the optical mechanism 10 can further comprise using the posture detection unit to detect the relationship between the optical axis 310 and the gravity direction, and using the control module 700 to make a correction according to the relationship between the optical axis 310 and the gravity direction.

For example, when the user holds the electronic device 20 having the optical mechanism 10 (such as the portable device), the bottom 12 may be closer to the ground (than the frame 110), or the frame 110 may be closer to the ground (than the bottom 12). Since the optical mechanism 10 can be in these different positions, the required current for driving the optical member holder 210 to move a predetermined distance is different. Therefore, the relationship between the distance between the optical member 300 and the bottom 120 and the current flowing through the driving module 600 with various angles between the optical axis 310 and the gravity direction can be measured and compiled into data, and the control module 700 can make a correction based on the aforementioned data.

Figure 6A:
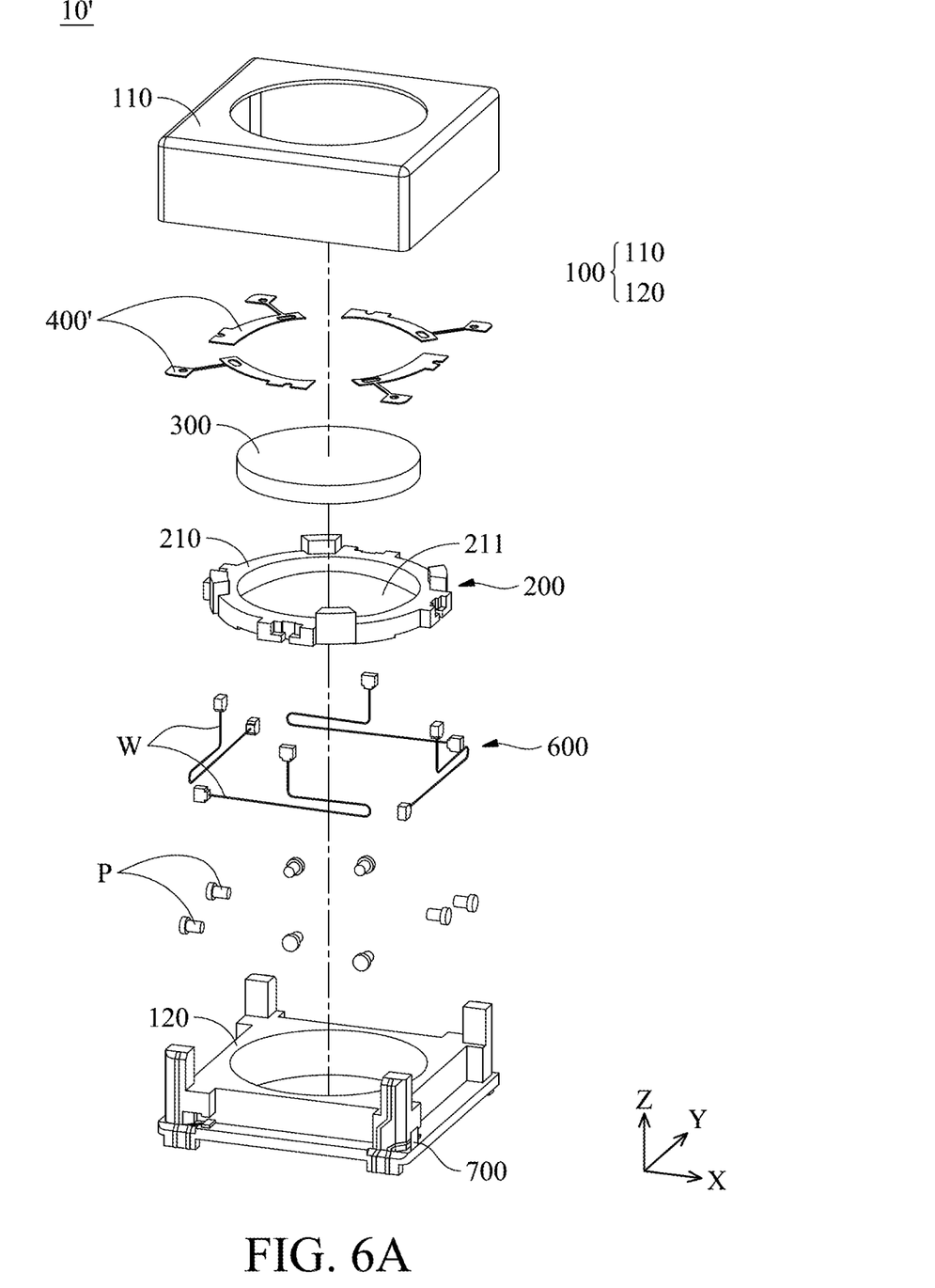
FIG. 6A is an exploded-view diagram of an optical mechanism according to another embodiment of the invention.
Figure 6B:
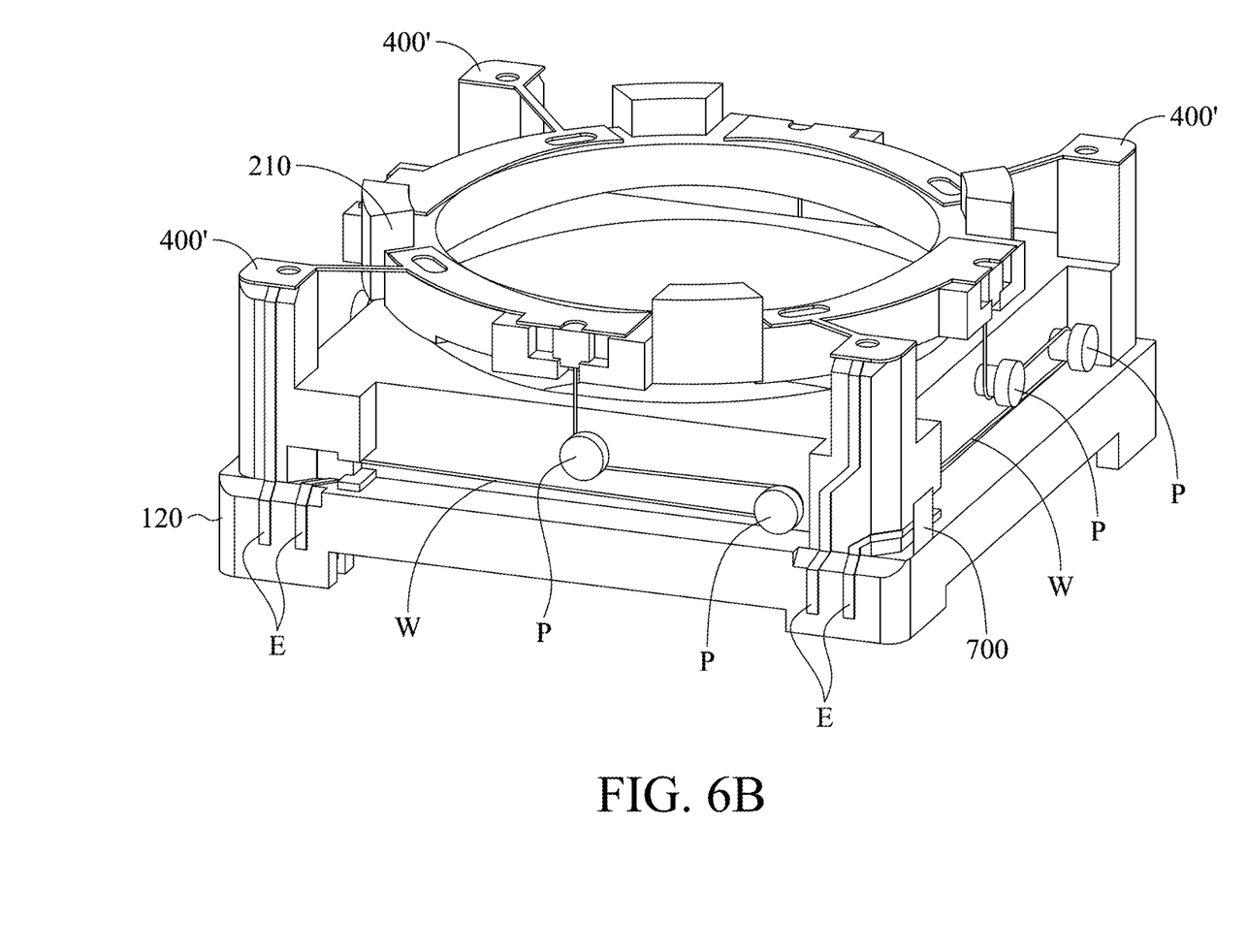
FIG. 6B is a schematic diagram of a bottom, a movable portion, a plurality of elastic members, a driving module, and a control module according to another embodiment of the invention.

Referring to FIGS. 6A and 6B, in another embodiment, the optical mechanism 10' comprises a fixed portion 100, a movable portion 200, an optical member 300, a plurality of elastic members 400', a driving module 600, and a control module 700. The fixed portion 100 comprises a frame 110 and a bottom 120, and the frame 110 and the bottom 120 can be assembled to form a rectangular hollow box. The movable portion 200 can be an optical member holder 210, and the optical member 300 can be disposed in a through hole 211 at the center of the optical member holder 210.

Each of the elastic members 400' is connected to the bottom 120 of the fixed portion 100 and the optical member holder 210, therefore, the optical member holder 210 is movably connected to the fixed portion 100. The driving module 600 comprises a plurality of biasing members W. The biasing members W can be disposed on four sides of the bottom 120 by the positioning member P, and the opposite ends of each of the biasing members W are respectively affixed to the bottom 120 and the optical member holder 210 (for example, by an engaging means or an adhesive). Furthermore, in this embodiment, the elastic members 400' are spring sheets having metal. The biasing members W can be electrically connected to the elastic members 400'.

Referring to FIG. 6B, in this embodiment, a plurality of conductors E (such as wires) are disposed on the bottom 120 of the fixed portion 100, and electrically connected to the elastic members 400' and the biasing members W to form four independent circuits. The control module 700 can be electrically connected to the biasing members W of the driving module 600 by the conductors E, and apply driving signals (such as currents) to the biasing members W, so as to adjust the lengths of the biasing members W.

In particular, when the same driving signals are applied to the biasing members W, the change of length in all of the biasing members W are the same. Therefore, the optical member holder 210 and the optical member 300 can move along the optical axis 310 relative to the bottom 120. When different driving signals are applied to the biasing members W, the change of length of each of the biasing members W is different. Therefore, the optical member holder 210 and the optical member 300 can rotate relative to the fixed portion 100. Thus, the aforementioned correction method for the optical mechanism (steps S1-S7) can be also used in this optical mechanism 10'.

It should be noted that the conductors E are formed on the bottom 120 by the molded interconnect device (MID) using, for example, laser direct structuring (LDS), microscopic integrated processing technology (MIPTEC), laser induced metallization (LIM), laser restructuring print (LRP), an aerosol jet process, or a two-shot molding method. Therefore, the number of components in the optical mechanism 10' can be reduced, and the dimensions thereof can also be greatly reduced.

Figure 7A:
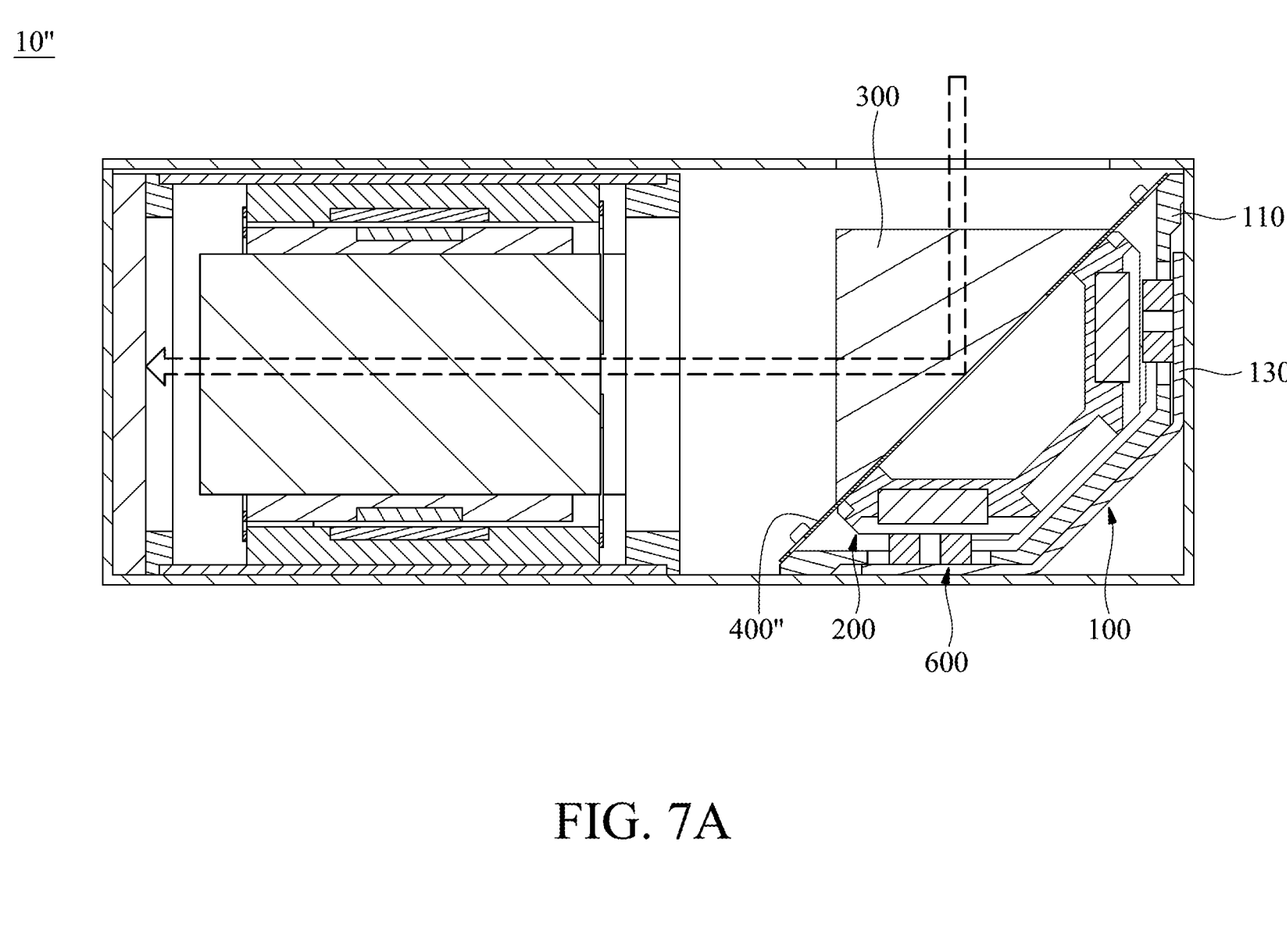
FIG. 7A is a schematic diagram of an optical mechanism according to another embodiment of the invention.
Figure 7B:
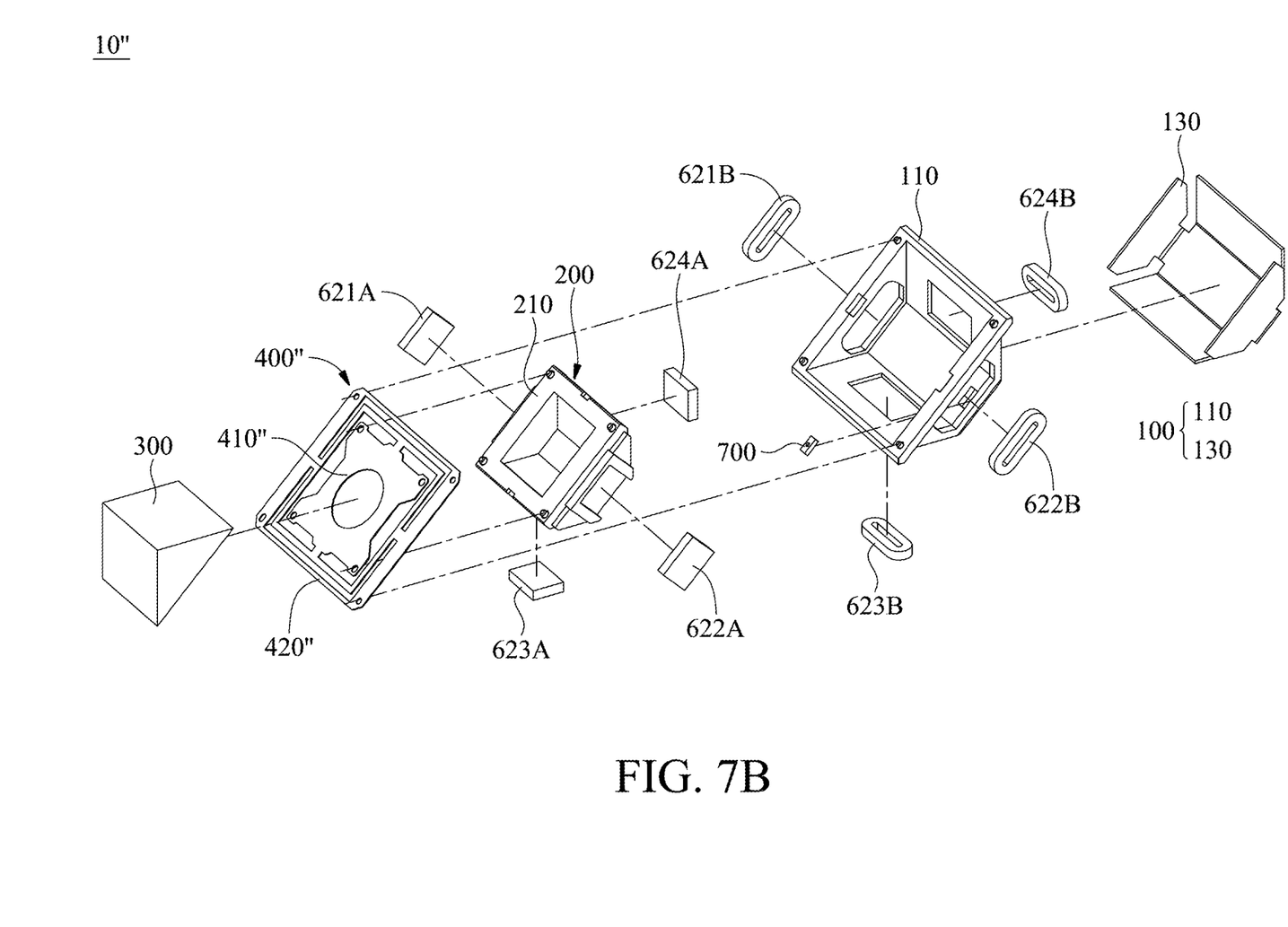
FIG. 7B is an exploded-view diagram of the optical mechanism according to another embodiment of the invention.

Referring to FIGS. 7A and 7B, in another embodiment, the optical mechanism 10" comprises a fixed portion 100, a movable portion 200, an optical member 300, an elastic member 400", a driving module 600, and a control module 700. The fixed portion 100 comprises a frame 110 and a circuit board 130, and the movable portion 200 is an optical member holder 210.

The outer section 420" of the elastic member 400" is affixed to the frame 110, and the inner section 410" is connected to the optical member 300 and the optical member holder 210. It should be noted that, in this embodiment, the optical member 300 is a prism, and the optical member 300 and the optical member holder 210 are respectively affixed to the opposite surfaces of the inner section 410" of the elastic member 400". Therefore, external light can be reflected by the optical member 300 and reach the image sensor in the electronic device 20.

The control module 700 is disposed on the circuit board, and electrically connected to the driving module 600. The driving module 600 comprises electromagnetic driving members 621A, 621B, 622A, 622B, 623A, 623B, 624A, 624B. The electromagnetic driving members 621A, 622A, 623A, and 624A are disposed on the optical member holder 210, and the electromagnetic driving members 621B, 622B, 623B, and 624B are disposed on the circuit board 130. In this embodiment, the electromagnetic driving members 621A, 622A, 623A, and 624A are magnetic members (such as magnets), and the electromagnetic driving members 621B, 622B, 623B, and 624B are driving coils. In some embodiments, the electromagnetic driving members 621A, 622A, 623A, and 624A can be driving coils, and the electromagnetic driving members 621B, 622B, 623B, and 624B can be magnetic members (such as magnets).

When currents with different energies or different directions flow through the electromagnetic driving members 621B and 622B, the driving force provided by the electromagnetic driving members 621A and 621B is different from the driving force provided by the electromagnetic driving members 622A and 622B. The optical member holder 210 and the optical member 300 disposed thereon can be driven to rotate around a rotation axis. Similarly, when currents with different energies or different directions flow through the electromagnetic driving members 623B and 624B, the driving force provided by the electromagnetic driving members 623A and 623B is different from the driving force provided by the electromagnetic driving members 624A and 624B. The optical member holder 210 and the optical member 300 disposed thereon can be driven to rotate around another rotation axis.

Thus, the aforementioned correction method for optical mechanism (steps S1-S7) can be also applied to this optical mechanism 10". It should be noted that, in common operation, the driving module 600 merely drives the prism (the optical member 300) to rotate. Step S1 is therefore adjusted as follows: measuring the angle between the optical member 300 and the fixed portion 100 (step S1). Also, step S2 (measuring the angle between the optical axis 310 of the optical member 300 and the reference surface 121 with an external apparatus) will be performed at the various angles measured in step S1.

In summary, a correction method for an optical mechanism having an optical member and a fixed portion is provided, including: measuring the angle between the optical axis of the optical member and a reference surface of the fixed portion using an external apparatus; compiling the result of measuring the angle between the optical axis and the reference surface into data; inputting the data into a control module; using the control module to transmit a signal to a driving module according to the data; and driving the optical member to rotate or move relative to the fixed portion by the driving module upon receiving the signal. Since the optical mechanism does not include a sensor to detect the angle between the optical axis and the reference surface, the dimensions of the optical mechanism can be reduced, so as to facilitate the miniaturization of the electronic device.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A correction method for an optical mechanism having an optical member and a fixed portion, comprising:
   measuring the angle between an optical axis of the optical member and a reference surface of the fixed portion with an external apparatus;
   compiling the result of measuring the angle between the optical axis and the reference surface into data;
   inputting the data into a control module;
   transmitting a signal to a driving module by the control module according to the data; and
   driving the optical member to rotate or move relative to the fixed portion by the driving module upon receiving the signal, wherein the optical mechanism does not include a sensor to detect the angle between the optical axis and the reference surface.

2. The correction method as claimed in claim 1, wherein the step of measuring the angle between the optical axis and the reference surface by the external apparatus further comprises measuring the angle between the optical axis and the reference surface with different distances or angles between the optical member and the fixed portion.

3. The correction method as claimed in claim 1, wherein the step of compiling the result of measuring the angle between the optical axis and the reference surface into data further comprises converting the result of measuring the angle between the optical axis and the reference surface into a trend line.

4. The correction method as claimed in claim 3, wherein the step of converting the result of measuring the angle between the optical axis and the reference surface into the trend line is performed by an external computer.

5. The correction method as claimed in claim 3, wherein the step of compiling the result of measuring the angle between the optical axis and the reference surface into data further comprises calculating the difference between the tread line and the angle between the optical axis and the fixed portion.

6. The correction method as claimed in claim 1, wherein the correction method further comprises using the control module to convert the result of measuring the angle between the optical axis and the reference surface into a trend line after inputting the data into the control module.

7. The correction method as claimed in claim 6, wherein the control module comprises a central processing unit and a driver integrated circuit, and the step of converting the result of measuring the angle between the optical axis and the reference surface into the trend line is performed by the central processing unit.

8. The correction method as claimed in claim 1, wherein the correction method further comprises:
   detecting the distance or the angle between the optical member and the fixed portion by a position sensor; and
   ensuring that the distance or the angle between the optical member and the fixed portion corresponds to the angle between the optical axis and the reference surface, and compiling the same into data.

9. The correction method as claimed in claim 1, wherein the correction method further comprises:
   recording the relationship between the distance or the angle between the optical member and the fixed portion and the current flowing through the driving module; and
   ensuring that the current flowing through the driving module corresponds to the angle between the optical axis and the reference surface, and compiling into data.

10. The correction method as claimed in claim 9, wherein the correction method further comprises recording the relationship between the distance or the angle between the optical member and the fixed portion and the current flowing through the driving module with various angles between the optical axis and the gravity direction.

11. The correction method as claimed in claim 10, wherein the correction method further comprises:
    detecting the relationship between the optical axis and the gravity direction using a posture detection unit; and
    using the control module to make a correction according to the relationship between the optical axis and the gravity direction.

12. The correction method as claimed in claim 11, wherein the optical mechanism, the control module, and the posture detection unit are disposed in a portable device.

* * * * *